No. 734,241. PATENTED JULY 21, 1903.
C. RAMSDELL.
THRESHING MACHINE AND GRAIN SEPARATOR.
APPLICATION FILED MAY 14, 1902.
NO MODEL. 3 SHEETS—SHEET 1.
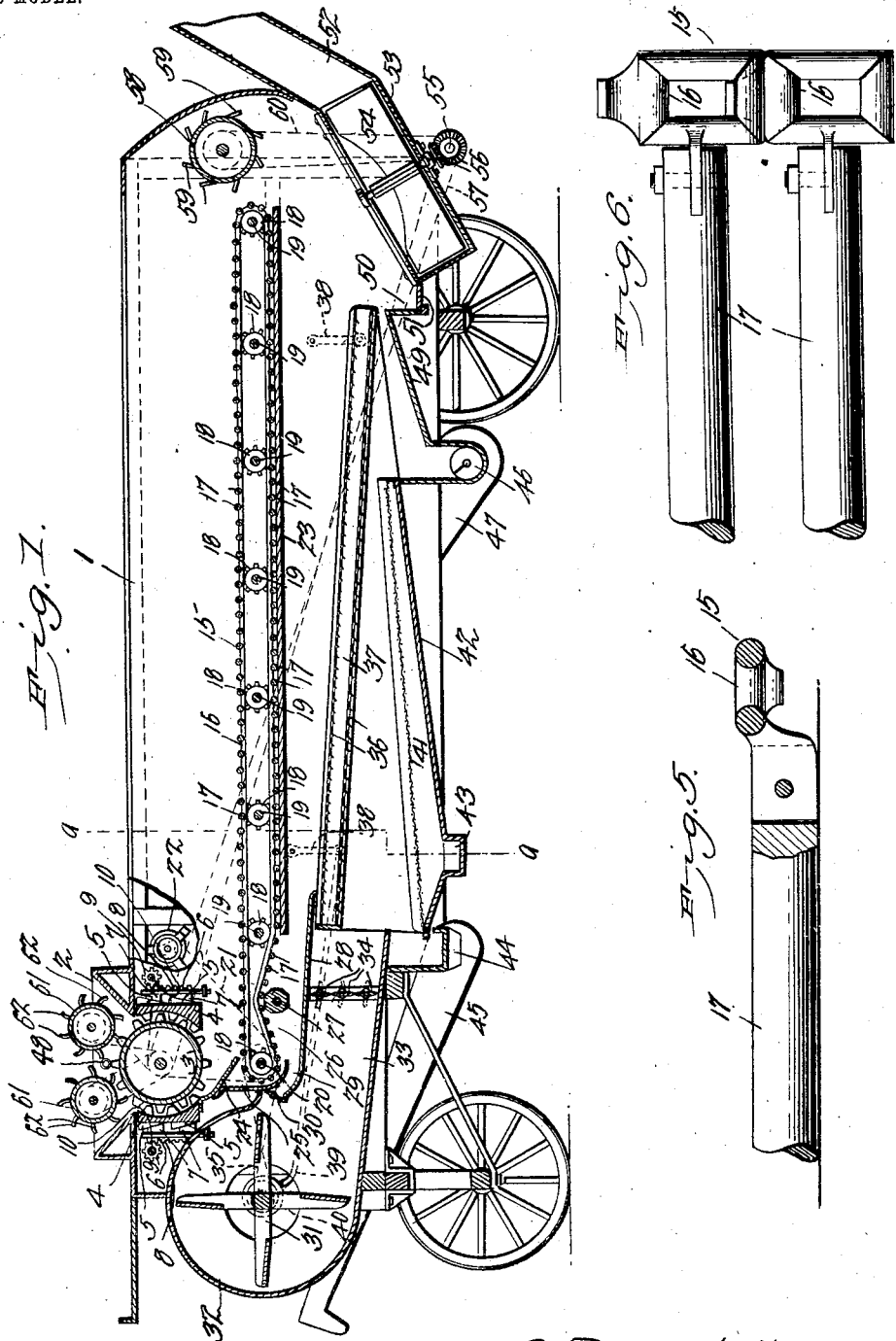

No. 734,241. PATENTED JULY 21, 1903.
C. RAMSDELL.
THRESHING MACHINE AND GRAIN SEPARATOR.
APPLICATION FILED MAY 14, 1902.
NO MODEL. 3 SHEETS—SHEET 2.
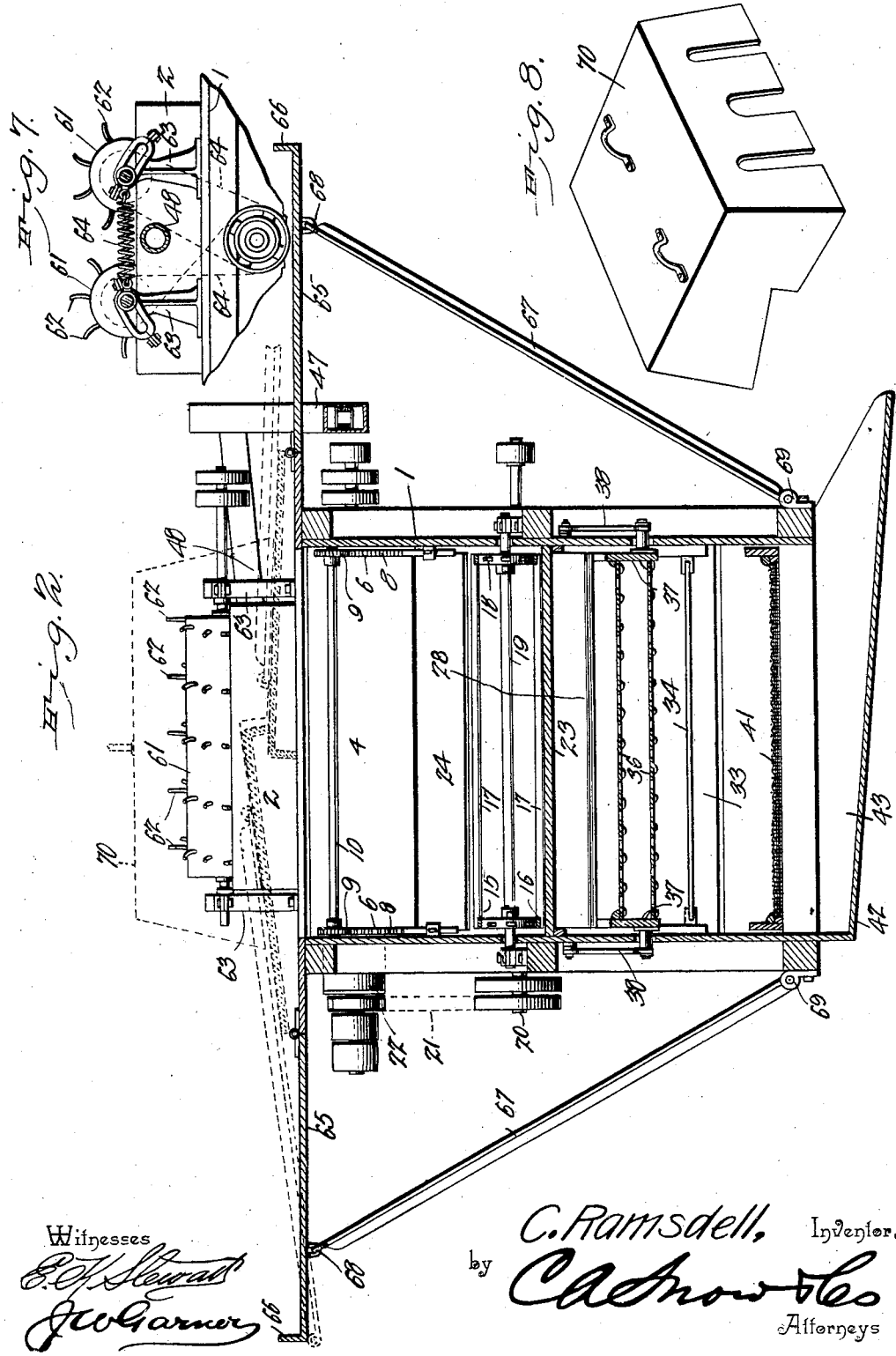
Witnesses
C. Ramsdell, Inventor.
by C. A. Snow & Co.
Attorneys

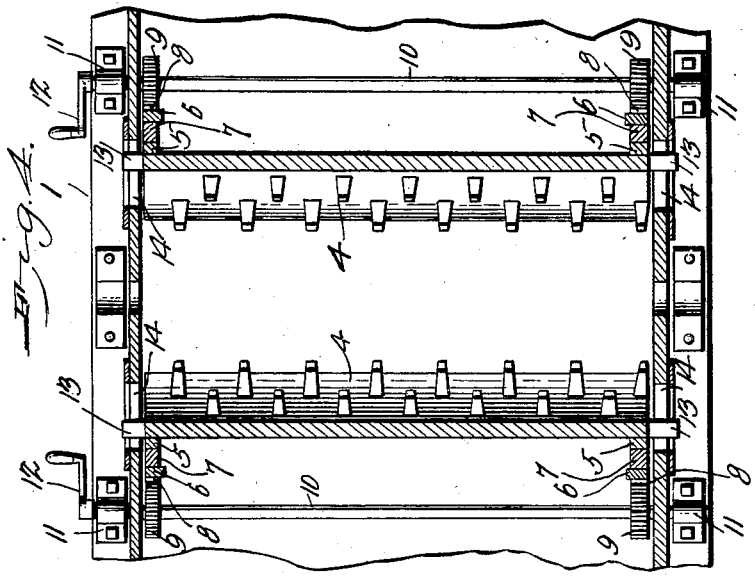

No. 734,241. Patented July 21, 1903.

UNITED STATES PATENT OFFICE.

CHAUNCEY RAMSDELL, OF FORESTVILLE, NEW YORK.

THRESHING-MACHINE AND GRAIN-SEPARATOR.

SPECIFICATION forming part of Letters Patent No. 734,241, dated July 21, 1903.

Application filed May 14, 1902. Serial No. 107,353. (No model.)

*To all whom it may concern:*

Be it known that I, CHAUNCEY RAMSDELL, a citizen of the United States, residing at Forestville, in the county of Chautauqua and State of New York, have invented a new and useful Threshing-Machine and Grain-Separator, of which the following is a specification.

My invention is an improved threshing-machine and grain-separator; and it consists in the peculiar construction and combination of devices hereinafter fully described and claimed.

In the accompanying drawings, Figure 1 is a vertical longitudinal sectional view of a threshing-machine and grain-separator constructed in accordance with my invention. Fig. 2 is a vertical transverse sectional view of the same, taken on a plane indicated by the line *a a* of Fig. 2. Fig. 3 is a detail vertical longitudinal sectional view showing the threshing end of the machine on a somewhat larger scale than that of Fig. 1. Fig. 4 is a detail horizontal sectional view taken on a plane indicated by the line *b b* of Fig. 3. Fig. 5 is a detail sectional view of the raddler. Fig. 6 is a detail top plan view of the same. Fig. 7 is a detail elevation of the feed-drums, showing their adjustable bearings. Fig. 8 is a detail perspective view of the removable cap to cover the feeding and threshing mechanisms.

In the embodiment of my invention I provide a suitable casing 1, on the top of which, at its front end, is a feed-hopper 2. Below the feed-hopper is a threshing-cylinder 3, the upper side of which is in the contracted throat at the lower side of the feed-hopper. On opposite sides of the threshing-cylinder are concaves 4, which are detachably mounted in the sides of the frame 1 by any suitable means which will admit of the ready removal of the concaves, and the same are movable toward and from the cylinder 3 and are provided on their outer sides with downwardly-extending wedge-shaped cams 5. The inter-current teeth of the cylinder and concaves are preferably of the form shown in the drawings. It will be noted that the concaves are vertically disposed on opposite sides of the threshing-cylinder and the direction of rotation of the latter is indicated by an arrow in Figs. 1 and 3. Hence the grain passes downwardly between one side of the threshing-cylinder and one of the concaves, and owing to the vertical disposition of the latter the weight of the grain is utilized to promote its passage between the cylinder and concave, the grain tending to pass by gravity between them, and hence the power or efficiency of the threshing-cylinder is correspondingly increased. Vertically-movable adjusting-bars 6 are provided, which are disposed on the outer sides of the concaves. The said adjusting-bars have wedge-shaped cams 7, which coact and engage with the cams 5, and are provided on their outer sides with racks 8, which are engaged by adjusting-pinions 9 on shafts 10. Said shafts are journaled in suitable bearings, (indicated at 11 in Fig. 4,) and are provided with cranks 12 or other suitable means whereby they may be turned to move the adjusting-bars vertically, and hence cause the concaves to be adjusted toward or from the threshing-cylinder, as may be desired. As shown in Fig. 4, the concaves have supporting-bars 13, which are extended beyond them and operate in horizontal guide-slots 14 in the sides of the casing.

A raddler 15 is disposed horizontally in the casing and extends nearly throughout the entire length thereof. The raddler comprises endless sprocket-chains 16 and cross-bars 17, which connect them together. The said cross-bars are appropriately spaced apart and are either cylindrical in cross-section, as here shown, or of elliptical shape in cross-section, as may be preferred. The upper and lower leads of the raddler-chains engage sprocket-wheels 18 on idler-shafts 19 and on a power-shaft 20. The latter may be driven by any suitable means. An endless belt 21 is indicated in dotted lines in Fig. 1 as connecting pulleys on the said shaft, the threshing-cylinder shaft, and the shaft of an exhaust-fan 22 to communicate motion to the shaft 20, and hence to the raddler and move the latter, so that its upper lead travels rearwardly and its lower lead travels forwardly. A floor or bottom board 23 is disposed under the raddler from the rear portion thereof to within a suitable distance of its front end. The lower lead of the raddler moves forwardly on the said floor or bottom board.

Below the threshing mechanism is a rearwardly and downwardly inclined deflector 24, which discharges on the front portion of the upper lead of the raddler. A deflector 25 extends downwardly from the deflector 24 immediately in front of the raddler and has its lower portion bent rearwardly under the same. An opening 26 is formed between the deflectors 24 25 and the front end of the floor or bottom board 23, and in the said opening is disposed a revoluble vibrator 27, which is here shown as polygonal in cross-section and as engaging the under lead of the raddler, and hence the said vibrator, which is revolved by frictional contact with the under lead of the raddler, owing to the polygonal form of the vibrator, imparts vibratory motion to the lower lead of the raddler where the latter spans the opening 26, as will be understood, and for the purpose hereinafter stated. Within the scope of my invention the vibrator may be rotated by any suitable means, and I do not limit myself in this particular. Neither do I limit myself to the particular form of vibrator herein shown and described, as the same may be modified within the scope of the appended claims. Under the opening 26 is a rearwardly-extending deflector 28. The front end thereof is curved upwardly under the rearwardly-curved lower portion of the deflector 25, thereby forming a passage 29 between the said deflectors 25 28, and in the said passage is a valve 30, by which the same may be closed or opened to any desired extent.

In the front end of the casing 1 is a blower-fan 31, the drum or casing 32 of which has a discharge-spout 33, that extends rearwardly under the deflector 28 and in which are a number of valves 34, by which means the said spout 33 may be opened or closed to any desired extent. Within the scope of my invention the blower-fan may be rotated by any suitable means. In Fig. 1 of the drawings an endless belt 35 is indicated in dotted lines as connecting pulleys on the blower-shaft and on the shaft 20, which drives the raddler.

A pair of rearwardly and downwardly inclined chaffing-screens 36, which are disposed one above the other, are carried by a shoe 37 and are disposed under the bottom board 23 at a suitable distance below the same and extend from a point under the rear portion of the deflector 28 nearly to the rear end of the casing 1. The shoe 37 is supported by hangers 38, which are indicated in dotted lines, and in practice the chaffing-screens are lip-screens made of sheet metal, having semi-circular perforations and downwardly-bent lips, which incline forwardly and are preferably at an angle of about thirty-five degrees from the perpendicular. The shoe 37, which carries the chaffing-screens, is vibrated longitudinally by a pitman 39 and an eccentric 40, the latter being on the blower-shaft. The eccentric is so disposed on the blower-shaft with relation to the hangers 38 that the latter are vertical when the chaffing-screens are at the rearward limit of their movements, and said hangers hence incline forwardly when the chaffing-screens are at the front end of their stroke, and this disposition of the eccentric and hangers facilitates the rearward movement of material on the chaffing-screens.

Under the chaffing-screens, which are of considerable length and in practice are very much longer than those usually employed in machines of this class, is a separating-screen 41, which inclines downwardly and forwardly and is reversely disposed with reference to the inclination of the chaffing-screens 36. This separating-screen extends from under the front ends of the chaffing-screens nearly to the rear ends thereof and in practice greatly exceeds the length of the separating-screens usually employed in machines of this class. The separating-screen is disposed in the shaking-shoe 42, the bottom of which is inclined, as shown, and is provided with a transversely-arranged gravity discharge-spout 43. A laterally-inclined trough 44 is disposed at the front end of the separating-screen to receive the grain discharged therefrom and which fails to pass therethrough, and the said trough 44 conducts to a bagging-spout 45, which may be of suitable construction and which is employed to cause the grain to be fed to the bags or sacks. At the rear end of the shoe 42 and below the same is a transversely-disposed conveyer 46. The same leads to a return-elevator 47, which discharges onto the threshing mechanism, as at 48. The forwardly and downwardly inclined deflector 49 is disposed under the rear portion of the chaffing-screens and conducts to the conveyer 46, as will be understood from an inspection of Fig. 1. In rear of the deflector 49 is a trough 50, the bottom of which is formed by a gate or valve 51, which may be opened or closed. The bottom 42 is spaced considerably below the screen 41 to allow the air-blast to pass through the latter.

A pneumatic stacker-tube 52 leads from a laterally-inclined drum 53, in which is a blower-fan 54. The upper side of the said drum 53 is open and is disposed below and extends to the rear of the raddler and is also below the chaffing-screens, so that it is adapted to receive the material or the lighter particles thereof—such as chaff, pieces of straw, and other light trash—from the chaffing-screens. Any suitable means may be employed to drive the fan 54. As here shown, the shaft is connected to a horizontally-disposed shaft 55 by miter-gears 56, and said shaft 55 is driven by a crossed belt 57, which connects pulleys on said shaft and on the shaft of the threshing-cylinder.

A feeder 58, which is here shown as a revoluble drum having tangentially-disposed wings 59, is located in the closed rear portion of the casing 1 in rear of the raddler and above the fan 54, and is here shown as connected by an endless belt 60 with a pulley on its shaft and a pulley on the shaft 55, whereby the said feeder is driven.

A pair of revoluble feeders 61, which rotate in reverse directions, are disposed in the feed-hopper 2 and over the threshing-cylinder. The said feeders are here shown as cylindrical in form with reversely-curved teeth 62, and the shafts of the said feeders are mounted in curved slot-bearings 63, which admit of the movement of the feeders toward and from each other. Springs 64 are employed to normally move the feeders toward each other, and the said springs are here shown as coiled retractile springs which connect the respective shafts of the feeders together; but the said springs may be of any form preferred and may be disposed in any suitable manner to normally press the feeders toward each other and permit the feeders to move apart to widen the space between them when an increased quantity of material gets between them. Any suitable means may be employed to rotate the said feeders. They are here shown as connected by belts 64 to the threshing-cylinder shaft, the latter and the feeder-shafts being provided with suitable pulleys and engaged by said belts and one of the latter being crossed. This is shown in Fig. 7. Hence the axes of the feeders are movable concentrically with reference to the cylinder-shaft and the said feeders are positively driven, while permitted to move toward and from each other.

On opposite sides of the machine-casing 1 at the top thereof are hinged table-leaves 65. The same are adapted to be extended outwardly from the sides of the casing, as shown in full lines in Fig. 2, and to be folded inwardly over the same and overlapped with reference to each other to form a cover for the machine-casing when the same is not in use, as indicated in the said Fig. 2 in dotted lines. The said table-leaves have flanges 66 at their outer sides, which extend upwardly when the same are in the position shown in full lines in Fig. 2, and it will be understood that the said flanges prevent grain from falling outwardly off the table-leaves. The latter may be of any suitable length and breadth, are here shown as of the same length as the machine-casing 1, and are provided with supporting-bars 67, which are hinged or pivotally connected to their under sides, as at 68, and are adapted to be connected at their lower ends to the sides of the casing either as shown at 69 or by any other suitable means. It will be understood that the bars 67 support the table-leaves when the latter are extended horizontally from the sides of the machine and that said supports 67 lie upon the table-leaves when the latter are folded over the casing to close the upper side thereof and form a roof for the machine. I also provide a cap 70 to cover the feed-hopper 2 and the threshing mechanism when the table-leaves are folded over the top of the machine. The table-leaves form a platform on opposite sides of the machine on which the thresher-men stand when the machine is in operation. As before stated, the said table-leaves catch the loose grain which falls from the sheaves and the flanges 66 prevent the discharge of the grain from the outer sides of the table-leaves. When the latter are raised, the grain thereon is discharged into the machine, and hence it is never necessary to clean up the barn floor or ground under the machine, as is now the practice.

In the operation of my improved threshing-machine and grain-separator the material is delivered by the feeders upon the cylinder, from whence it passes down between it and one of the concaves and is acted on by the intercurrent teeth in the usual manner. Any straw which remains caught in the teeth is carried up into the second concave, which serves to thoroughly disintegrate it, disengage the grain, and clear the teeth. The concaves may be independently adjusted to occupy different distances from the cylinder to secure the best results. The threshed material drops directly down upon the raddler, where it is subjected to the agitation of the member 27, which, while considerably greater than that in other portions of the device, acts upon the lower lead, so that not an excessive quantity of straw will be caused to pass between the bars. In this way the greater portion of the grain is caused to at once fall through the bars upon the deflector 28, which discharges onto the upper chaffing-screen. As the portion remaining on the raddler passes forward it is subjected to the more gentle agitation produced by the action of the sprockets, and such grain as is commingled with the straw becomes separated therefrom and drops through the spaces between the bars 17 of the raddler onto the floor or bottom board 23, and is carried forwardly thereon by the lower lead of the raddler and delivered onto the deflector 28 and from thence to the chaffing-screen, as will be understood. The threshed grain passes rearwardly over the chaffing-screens, and its movement on the upper chaffing-screen may be accelerated as may be required by opening the valve 30, so that a blast from the blower 31 may be caused to pass rearwardly over the upper chaffing-screen. It will be understood that the valves 34 will be also opened to a suitable extent to cause a blast to pass rearwardly over the separating-screen 41 between the latter and the chaffing-screens and upwardly through the chaffing-screens, the blast being deflected upwardly through the openings in the chaffing-screens by the lips thereof, as will be understood. The area of the chaffing-screens is such that the chaff is separated from the grain and the latter is dropped from the chaffing-screens onto the separating-screen 41. The chaff and other light refuse material is carried by the blast from the fan 31 and by the exhaust-current set up in the rear portion of the casing by the stacker-fan into the casing of the latter, and hence is discharged, together with the straw, through the stacker-tube; but heavy foreign particles, such as stones, pieces of iron, and the like, are caught in the trough 50 and accumulate therein on the gate or valve 51. The latter may be opened from time to time to discharge such heavy particles. Such material as passes through the chaffing-screens in rear of the separating-screen 41 is caught by the deflector 49, discharged by gravity onto the conveyer 46, and is hence fed to the return elevator 47 and carried back and refed to the threshing mechanism. Cockle, cheat, and immature and undersized grain passes through the meshes of the separating-screen 41 and is discharged by the spout 43. The grain passes from over the front end of the separating-machine into the spout 44 and from thence to the bagger. The gate or valve 51 may be also employed to regulate the intake of air by the stacker-fan.

Having thus described my invention, I claim—

1. The combination with a threshing-cylinder, of coöperating concaves disposed one at each side of the cylinder, toothed, oppositely-revoluble feed-rolls disposed above the space between the upper ends of the concaves, and means for adjusting said feed-rolls concentrically with relation to the cylinder to increase or diminish the space between said feed-rolls.

2. The combination with a threshing-cylinder, of a coöperating concave at each side of the cylinder, concentrically-adjustable feed-rolls above the space between the upper ends of said concaves, and separating mechanism beneath the space between the lower ends of the concaves.

3. The combination with a threshing-cylinder, of a coöperating concave at each side of the cylinder, means for independently adjusting the concaves relatively to the cylinder, and separating mechanism beneath the concaves.

4. The combination with threshing mechanism, of a raddler having one end directly below the cylinder and extending for some distance therefrom, means for agitating the raddler throughout its length, and means for imparting greatest agitation to the portion beneath the threshing mechanism.

5. The combination with threshing mechanism, of a raddler having one end below the cylinder and extending for some distance therefrom, sprockets upon which the raddler operates throughout its length, and an agitator acting upon the raddler between the sprockets and directly beneath the threshing mechanism.

6. The combination with threshing mechanism of a raddler having one end below the cylinder and extending for some distance therefrom, and a rotatable agitator acting upon the lower lead of the raddler directly beneath the threshing mechanism.

7. A threshing-machine and grain-separator having a stacker-tube, a blower to discharge therethrough, a chaffing element terminating in advance of said blower, a trough below the discharge end of the chaffing element and in proximity with the blower, and a valve in the bottom of the trough.

8. The combination with a threshing-cylinder, of feeders journaled in curved slots concentric with said cylinder, contractile springs connecting said feeders and mechanism connecting the cylinder with the feeders, whereby they will revolve toward each other.

In testimony that I claim the foregoing as my own I have hereto affixed my signature in the presence of two witnesses.

CHAUNCEY RAMSDELL.

Witnesses:
 LUCIUS H. DYE,
 GEORGE BLACK.